Feb. 14, 1933.   C. J. ANDERSON   1,897,035
GRINDING MACHINE
Filed Aug. 13, 1930   2 Sheets-Sheet 1

Inventor
Carl J. Anderson,

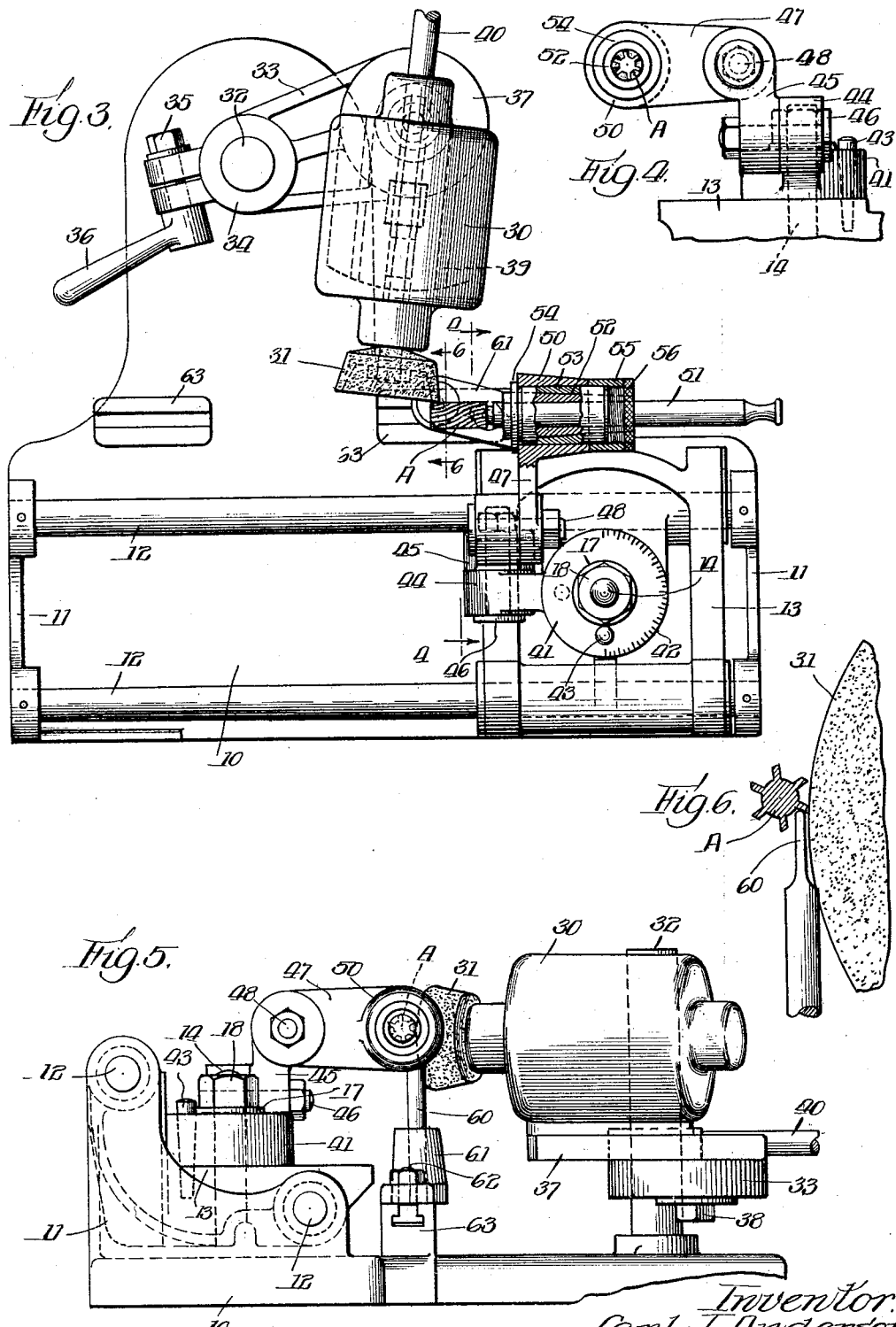

Patented Feb. 14, 1933

1,897,035

UNITED STATES PATENT OFFICE

CARL J. ANDERSON, OF CHICAGO, ILLINOIS, ASSIGNOR OF FIFTY-ONE AND TWO-THIRDS PER CENT TO ERIK BORG AND FIFTEEN PER CENT TO CARL U. JOHANSON, BOTH OF CHICAGO, ILLINOIS

GRINDING MACHINE

Application filed August 13, 1930. Serial No. 474,915.

The invention relates generally to grinding machines and more particularly to a bench type grinding machine for grinding relatively small pieces.

The general object of the invention is to provide a novel grinding machine having various attachments for mounting the pieces to be ground, said attachments being of different types and universally adjustable so that a wide variety of different classes of work may be ground.

Another object is to provide a grinding machine of this character which may be adjusted for the different classes of work by a comparatively unskilled workman with a relatively small amount of time required for making such adjustments.

A further object is to provide a grinding machine of this character which is constructed in a compact form to rest on a bench, and which is sturdily built and capable of producing accurately ground work.

Still another object is to provide a grinding machine of this character in which the work may be supported either between centers or in a hollow spindle with a grinding means which is universally adjustable relative to the work.

Other objects and advantages will become apparent from the following description taken in connection with the accompanying drawings, in which:

Fig. 3 is a plan view of the machine when arranged to support the work in a hollow spindle.

Fig. 4 is a fragmentary view taken along the line 4—4 of Fig. 3.

Fig. 5 is an elevation taken at the right-hand end of the machine as shown in Fig. 3.

Fig 6 is a fragmentary view taken along the line 6—6 of Fig. 3.

Figure 1:
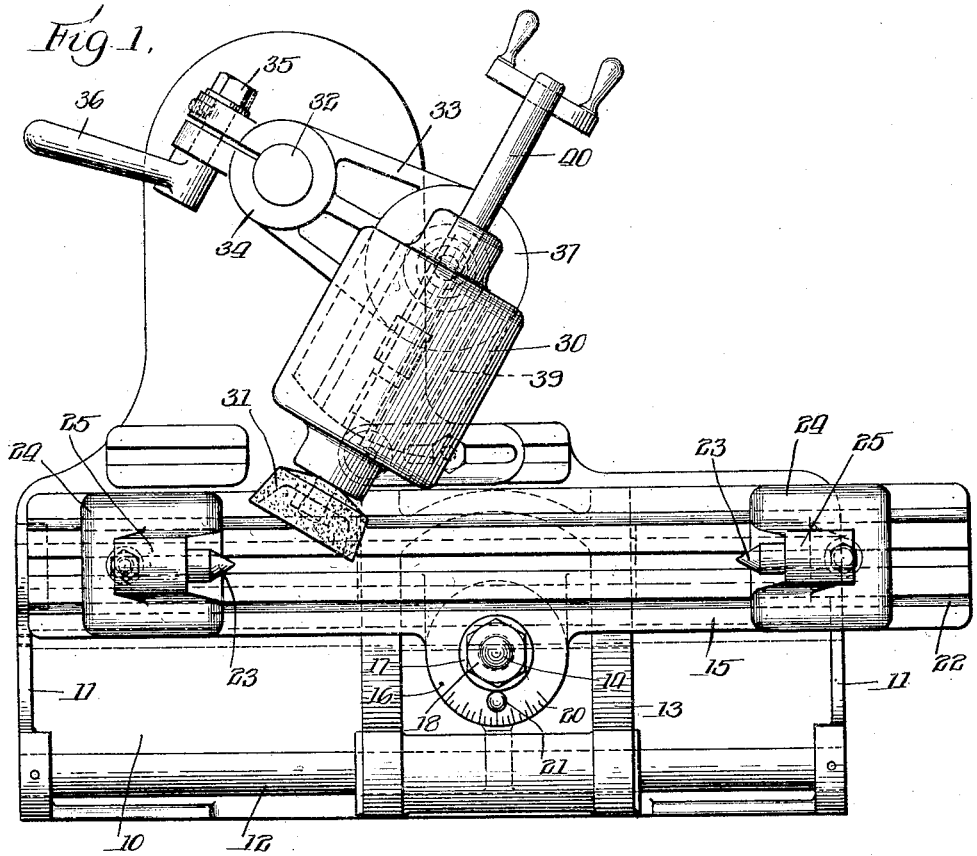
Figure 1 is a plan view of a machine embodying the features of the invention and when arranged to support the work on centers.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Figure 2:
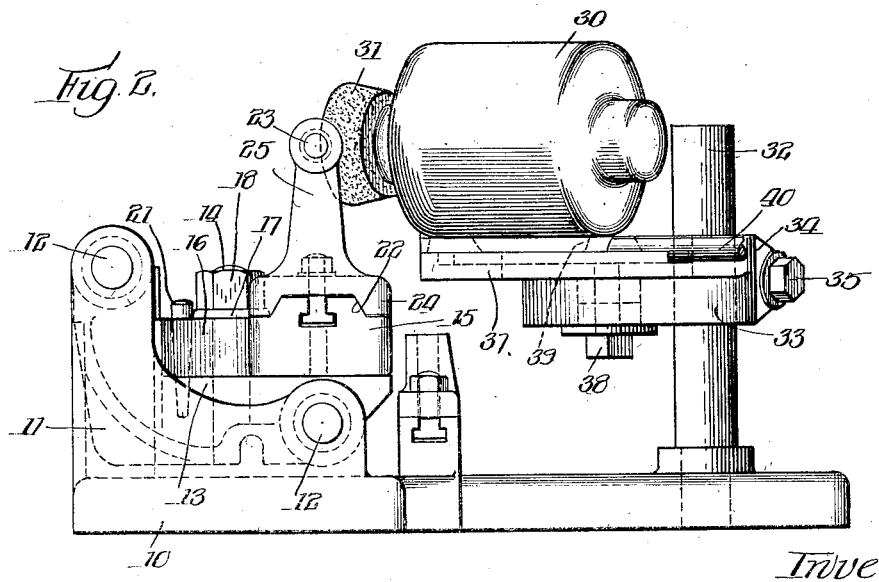
Fig. 2 is an elevation taken at the right-hand end of the machine shown in Fig. 1.

In its present embodiment, the machine comprises in general a frame, a carriage slidably mounted on the frame, means mounted on the carriage for adjustably supporting the work, and means for grinding the work mounted on the frame for universal adjustment relative to the work. The means for supporting the work may comprise a pair of centers as shown in Figs. 1 and 2 or a hollow spindle as shown in Figs. 3, 4 and 5.

As shown in the drawings, the frame comprises a base 10 made of cast metal upon which are integrally formed at the respective ends thereof a pair of uprights 11. Mounted horizontally in the uprights 11 is a plurality of parallel guide bars 12 which slidably support a carriage 13.

The carriage 13 comprises a metal casting having a plurality of horizontal holes formed therein for slidably receiving the guide bars 12, the holes being of substantial length to provide ample support against canting of the carriage relative to the bars 12. Between the holes receiving the bars 12, a horizontal surface is formed on the carriage from which a vertical pin 14 projects. Mounted upon the pin 14 is a work support.

As mentioned above, the work support may comprise either a pair of centers or a hollow spindle, depending upon the class of work to be ground.

In Figs. 1 and 2 a work support having a pair of centers is shown, which comprises a table 15 having a boss 16 extending to one side thereof midway between the ends. The boss 16 is mounted upon the pin 14 and is adapted to be clamped against the horizontal surface on the carriage in any position of angular adjustment around the pin 14 by means such as a washer 17 and a nut 18 threaded to the upper end of the pin 14.

To facilitate the angular adjustment of the table 15, a scale 20 may be marked on the upper surface of the boss 16, and a taper pin 21 extending through alined holes in the boss 16 and the carriage may be employed to lock the table in any given position, such as the position in which the axis of the work is held parallel to the direction of movement of the carriage.

On the upper surface of the table 15 horizontal guideways 22 are formed which may extend the length of the table. Upon the guideways 22, a pair of centers 23 are mounted. Each center is supported by a base 24, adjustably secured on said ways as by a T-bolt, and an upright 25 in which the center is secured.

The centers 23 are constructed to rotatably support a work piece while the latter is being ground and are adjustable toward and from each other along the table to accommodate work pieces of different lengths, the table being angularly adjustable in a horizontal plane around the pin 14.

The means for grinding the work mentioned above comprises a motor 30 upon the shaft of which is mounted a grinding wheel 31. While a cup-shaped wheel has been shown in the drawings, any shape of wheel may be used depending upon the particular class of work to be ground.

The motor 30 is supported by means comprising a vertical post 32 secured to and extending from the base 10. Pivotally mounted on the post 32 is a first arm 33 having a split boss 34 surrounding the post 32 and adapted to be clamped to the post 32 in any position of angular and vertical adjustment as by a bolt 35 and a nut having a hand lever 36.

To the free end of the first arm 33 a second arm 37 is pivotally secured as by a bolt 38. A dovetailed slide 39 is formed on the second arm 37 and the motor 30 is mounted on said slide for movement longitudinally of the motor shaft controlled by a hand screw 40. Thus, the motor 30 may be adjusted angularly to any position in a horizontal plane by the two arms 33 and 37 and the slide 39, and may be adjusted vertically by moving the arm 33 up and down on the post 32.

When the class of work to be ground is such that it may best be supported in a hollow spindle, as, for instance, a milling cutter having either a straight or tapered shank, the machine is arranged as shown in Figs. 3, 4 and 5.

For this arrangement of the machine, a member 41 is mounted on the carriage 13 in place of the table 15 and is secured thereto in its angularly adjusted position by the pin 14, the nut 18 and washer 17. The upper face of the member 41 may have a scale 42 to facilitate the angular adjustment thereof, and a taper pin 43 may be employed to lock the member 41 in one position.

Extending to one side of the member 41 is a lug 44 to which is secured a first arm 45 as by a bolt 46 for adjustment about a horizontal axis, and to the free end of the arm 45, a second arm 47 is secured as by a bolt 48 for adjustment about a horizontal axis at right angles to the first-mentioned horizontal axis. A hub 50 is formed on the free end of the second arm 47 which is provided with a hollow spindle to rotatably support the work piece.

For purposes of illustration, Fig. 3 shows the machine arranged to grind a small straight-shank spiral milling cutter A. The shank of the cutter is secured in an axial aperture in the end of a rod 51 which extends through the hub 50. Surrounding the rod 51 is a bushing 52 whose outer surface is tapered to fit within a hollow spindle 53 whose inner surface is correspondingly tapered. The spindle 53 is rotatably supported in the hub 50 and is retained therein by a flange 54 formed on one end of the spindle 53 and a knurled nut 55 threaded onto the other end thereof with a locking nut 56.

When the arms 45 and 47 and the member 41 are adjusted to support the cutter A in a suitable position, the grinding wheel is positioned by means of the motor support so that its axis forms an acute angle with the axis of the cutter (see Fig. 3) and is slightly below the axis of the cutter (see Fig. 6). Thus, when the wheel and cutter are brought into grinding relation, only one edge of the wheel will touch the cutter and that edge is in such a position that each tooth of the cutter will be backed off the required amount. The cutter is then moved back and forth across the wheel by manually sliding the rod 51 within the bushing 52.

On account of the spiral teeth of the cutter, it is necessary to rotate the cutter slightly during its back and forth movement. This is done by rotating the rod 51 under the control of a guide means which comprises a finger 60 projecting upwardly under the tooth being ground. The finger 60 is positioned to abut against the tooth immediately adjacent the point of grinding, and the tooth is held in such abutment during its back and forth movement, the spiral form of the tooth causing the required rotation of the cutter.

The finger 60 is secured in a support 61 adjustably secured by a T-bolt 62 to either one of two bosses 63 cast integrally with the base 10.

When a taper-shank cutter is to be ground, the rod 51 and the bushing 52 are not used, and the tapered shank of the cutter is inserted directly into the inner taper of the hollow spindle 53.

Through the universal adjustment afforded by the member 41 and the arms 45 and 47, a work piece in the hollow spindle may be supported in a wide variety of positions. The hollow spindle, or the centers 23, with the universal adjustment provided for the motor and grinding wheel permit the grinding of many classes of work. It is obvious that the adjustments may be made quickly and by a relatively unskilled workman, and that the machine is sturdy and capable of producing accurately ground work.

I claim as my invention:

1. A grinding machine comprising, in combination, a frame, a carriage slidably mounted on said frame, a work support mounted on said carriage and angularly adjustable relative to the direction of movement of said carriage, rotary means for grinding the work, a pair of arms supporting said grinding means for vertical adjustment relative to the frame and for angular adjustment relative thereto and to each other, and means interposed between said arms and the grinding means for longitudinal adjustment of the grinding means along its axis.

2. A grinding machine comprising, in combination, a frame, a carriage mounted on said frame for horizontal movement relative thereto, a work support mounted on said carriage and angularly adjustable in a horizontal plane, a vertical post mounted on said frame, a first arm mounted for vertical and angular adjustment on said post, a second arm mounted for angular adjustment on the free end of said first arm, a dovetail slide mounted on said second arm, and a motor having a grinding wheel on its shaft mounted in said dovetail for adjustment along the axis of said shaft.

3. A grinding machine comprising, in combination, a frame comprising a base and a pair of uprights at each end thereof, a plurality of parallel guide bars horizontally mounted in said uprights, a carriage slidably mounted on said guide bars and having a vertical pin between said guide bars, a work support comprising a table mounted on said carriage and angularly adjustable about said pin, means for clamping said table in an adjusted position relative to said carriage, horizontal guideways formed on said table, a pair of centers for rotatably supporting the work on a horizontal axis and adjustably secured on said ways, and means for grinding the work mounted on said frame for universal adjustment relative to the work.

4. A grinding machine comprising, in combination, a frame, a carriage slidably mounted on said frame, means for rotatably supporting the work mounted on said carriage for universal angular adjustment relative thereto, means for grinding the work mounted on said frame for universal adjustment relative to the work, and means for guiding the work while it is being ground.

5. A grinding machine comprising, in combination, a frame, a carriage mounted for horizontal movement on said frame, means for rotatably supporting the work comprising a member mounted on said carriage for angular adjustment in a horizontal plane, a first arm secured to said member for adjustment about a horizontal axis, a second arm secured to said first arm for adjustment about a horizontal axis at right angles to said first-mentioned horizontal axis and having a hub at its free end rotatably supporting the work, means for grinding the work mounted on said frame for universal adjustment relative to the work, and guide means adjustably mounted on the frame for guiding the work while it is being ground.

6. A grinding machine comprising, in combination, a frame, grinding means mounted on said frame for universal adjustment relative thereto, a carriage slidably mounted on said frame, a work support comprising a base, and a pair of adjustable centers mounted on said base for supporting one class of work, a work support comprising a base, and a hub adjustably mounted on said last-mentioned base for supporting a different class of work, and means for interchangeably connecting either of said bases to said carriage for angular adjustment relative thereto.

7. A grinding machine comprising, in combination, a frame, grinding means mounted on said frame for universal adjustment relative thereto, a carriage slidably mounted on said frame, a work support comprising a base having a horizontal slide, and a pair of centers adjustably mounted on said slide for supporting one class of work, a work support comprising a base, a hub for supporting a different class of work, and a pair of arms for attaching said hub to the last-mentioned base and affording universal adjustment therebetween, and means for interchangeably clamping either of said bases to said carriage in angularly adjusted positions.

8. A grinding machine comprising, in combination, a frame, a carriage slidably mounted on said frame, a work support mounted for angular adjustment on said carriage, a grinding wheel, and means for supporting and driving said grinding wheel comprising a post, a first arm having a split hub slidably and rotatably mounted on said post, means for clamping said hub on said post, a second arm pivotally mounted on the free end of said first arm, a bolt for clamping said arms together in pivotally adjusted positions, said second arm having a slide formed on its upper face, a motor mounted for movement along said slide and carrying said grinding wheel on its shaft, and manually operable means for adjusting said motor along said slide.

In testimony whereof, I have hereunto affixed my signature.

CARL J. ANDERSON.